United States Patent
Solem et al.

(10) Patent No.: US 9,208,567 B2
(45) Date of Patent: Dec. 8, 2015

(54) OBJECT LANDMARK DETECTION IN IMAGES

(71) Applicant: Apple Inc., Cupertino, CA (US)

(72) Inventors: Jan Erik Solem, San Francisco, CA (US); Jerome Piovano, Palo Alto, CA (US); Michael Rousson, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 13/909,838

(22) Filed: Jun. 4, 2013

(65) Prior Publication Data

US 2014/0355821 A1  Dec. 4, 2014

(51) Int. Cl.
G06K 9/46 (2006.01)
G06T 7/00 (2006.01)
G06K 9/00 (2006.01)
G06K 9/62 (2006.01)

(52) U.S. Cl.
CPC .......... *G06T 7/0046* (2013.01); *G06K 9/00281* (2013.01); *G06K 9/469* (2013.01); *G06K 9/621* (2013.01); *G06T 2207/20081* (2013.01); *G06T 2207/30201* (2013.01)

(58) Field of Classification Search
None
See application file for complete search history.

(56) References Cited

U.S. PATENT DOCUMENTS 7,809,192 B2  10/2010  Gokturk
8,180,112 B2  5/2012  Kurtz
8,280,173 B2  10/2012  Kato
2005/0001013 A1*  1/2005  Xie et al. ...................... 228/103
2008/0100612 A1*  5/2008  Dastmalchi et al. .......... 345/418
2008/0193020 A1  8/2008  Sibiryakov

OTHER PUBLICATIONS

Wikipedia article for "Support Vector Machine", retrieved from http://en.wikipedia.org/wiki/Support_vector_machine (Jun. 4, 2013).
T.F. Cootes, G.J. Edwards, and C.J. Taylor, "Active appearance models", Proceedings of the 5th European Conference on Computer Vision, Freiburg, Germany, Jun. 2-6, 1998, vol. 2, pp. 484-498.
J.M. Saragih, S. Lucey, and J. Cohn, "Face alignment through subspace constrained mean-shifts," 2009 IEEE 12th International Conference on Computer Vision, pp. 1034-1041, Sep. 29, 2009-Oct. 2, 2009.

(Continued)

*Primary Examiner* — Bhavesh Mehta
*Assistant Examiner* — Amandeep Saini
(74) *Attorney, Agent, or Firm* — Blank Rome LLP

(57) ABSTRACT

Techniques are provided to improve the performance and accuracy of landmark point detection using a Constrained Local Model. The accuracy of feature filters used by the model may be improved by supplying positive and negative sets of image data from training image regions of varying shapes and sizes to a linear support vector machine training algorithm. The size and shape of regions within which a feature filter is to be applied may be determined based on a variance in training image data for a landmark point with which the feature filter is associated. A sample image may be normalized and a confidence map generated for each landmark point by applying the feature filters as a convolution on the normalized image. A vector flow map may be pre-computed to improve the efficiency with which a mean landmark point is adjusted toward a corresponding landmark point in a sample image.

27 Claims, 8 Drawing Sheets

(56) References Cited

OTHER PUBLICATIONS

Yang Wang, Simon Lucey, and Jeffrey Cohn, "Enforcing Convexity for Improved Alignment with Constrained Local Models," IEEE International Conference on Computer Vision and Pattern Recognition (CVPR), Jun. 2008.

Cootes et al., "Active Shape Models-Their Training and Application", Computer Vision and Image Understanding, vol. 61, No. 1, pp. 38-59, Jan. 1995.

* cited by examiner

OBJECT LANDMARK DETECTION IN IMAGES

BACKGROUND

This disclosure relates generally to the detection of landmark points in images. More particularly, the disclosure relates to techniques to generate and fit an object model to a sample image that improves the accuracy and speed with which landmark points may be detected in the sample image.

Accurately locating landmark points in images is an important step in a number of image processing tasks such as face detection, face recognition, person or other object recognition, medical image analysis, image tagging, photo effects, photo adjustments, photo auto improvements, slideshows, image cropping, and other similar tasks. Typical objects of interest for which landmark detection may be desirable include faces, pets (e.g., dogs, cats, etc. and their faces), people, vehicles, etc. Landmark detection algorithms may employ a model generated from an offline set of training images depicting the particular object of interest. Each image in the set of training images may be annotated with the location of predetermined landmark points. For example, a model for a landmark detection algorithm to locate faces may be constructed from a set of images that are annotated to identify the location of eyes, eyebrows, nose, lips, and other recognizable points in each image.

The model generated offline may include a shape model and a data attachment term, each generated from annotated training data. The shape model may be generated from the position of landmark points in the training images. The purpose of the shape model is to model the position and displacement of the landmark points and to act as a regularization constraint to ensure that a "valid shape" is maintained when the model is fit to a sample image. In one approach, the shape model is generated using Principal Component Analysis of the concatenation of the coordinates of the landmark points in the training images to define a mean shape and a set of displacement modes. Referring to FIG. 1, the coordinates for multiple landmark points for individual training images 105 in training set 110 may be determined. The landmark points from the individual images 105 may then be merged to generate mean shape 115 (illustrated with lines connecting the mean landmark points for purposes of clarity), which may be expressed as multi-dimensional vector 120 that includes the two-dimensional coordinates of the vertices of mean shape 115.

The data attachment term is computed based on image pixel values around each landmark in the training images. The data attachment term varies according to the particular landmark detection algorithm that is employed, but, regardless of the exact form, its purpose is to drive an initial position of landmark points towards the correct position of the corresponding landmark point in a sample image (e.g., based on the mean shape). The Active Appearance Model adapts a shape model to fit a sample image by iteratively minimizing the distance between the sample image texture inside a mesh generated from the current location of the landmark points in the sample image and the average texture of the objects in the training set under the constraint of maintaining a valid shape. The Active Shape Model adapts each landmark point individually to fit a sample image, usually with an edge map, and then iteratively projects the adapted landmark points back on the shape model. Recently, Constrained Local Models have proven to be quite accurate and robust. The data attachment term for a Constrained Local Model is used to generate a confidence map from image data in a region surrounding each landmark point in a sample image. The landmark points are jointly adapted in a manner that maximizes the response of the landmark points' respective confidence maps.

Although Constrained Local Models have proven to be quite accurate, there is still room to improve the accuracy and speed with which landmark points are identified in a sample image. It would therefore be desirable to identify changes in the training and fitting operations associated with the location of landmark points in images using Constrained Local Models to improve accuracy and performance.

SUMMARY

A method of fitting a model to an object in a sample digital image may include receiving a sample image that includes a depiction of the object (e.g., a face object), obtaining a model having multiple landmark points (i.e., a model corresponding to the depicted object), and aligning at least one landmark point with at least one corresponding point in the image. The received image may be normalized and a confidence map may be generated for each landmark point by applying a filter corresponding to the landmark point to normalized image data within a filter region around the landmark point. Each confidence map may represent a likelihood that image data within the region represents a point of the object that corresponds to the landmark point. A vector flow map may then be generated for each confidence map and landmark points may be moved towards corresponding points of the object based on the vector flow map. The method may be embodied in program code and stored on a non-transitory medium. The stored program code may be executed by one or more processors that are part of, or control, a system that is configured to implement the method.

DETAILED DESCRIPTION

This disclosure pertains to systems, methods, and computer readable media for detecting landmark points in images. In general, a model is generated from a set of training data and is then adapted to fit a sample image. Embodiments of this disclosure are directed to improving the speed and accuracy with which the model can be fit to a sample image.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one embodiment of the invention, and multiple references to "one embodiment" or "an embodiment" should not be understood as necessarily all referring to the same embodiment.

It will be appreciated that in the development of any actual implementation (as in any development project), numerous decisions must be made to achieve the developers' specific goals (e.g., compliance with system- and business-related constraints), and that these goals will vary from one implementation to another. It will also be appreciated that such development efforts might be complex and time-consuming, but would nevertheless be a routine undertaking for those of ordinary skill in the art of image processing having the benefit of this disclosure.

Figure 1:
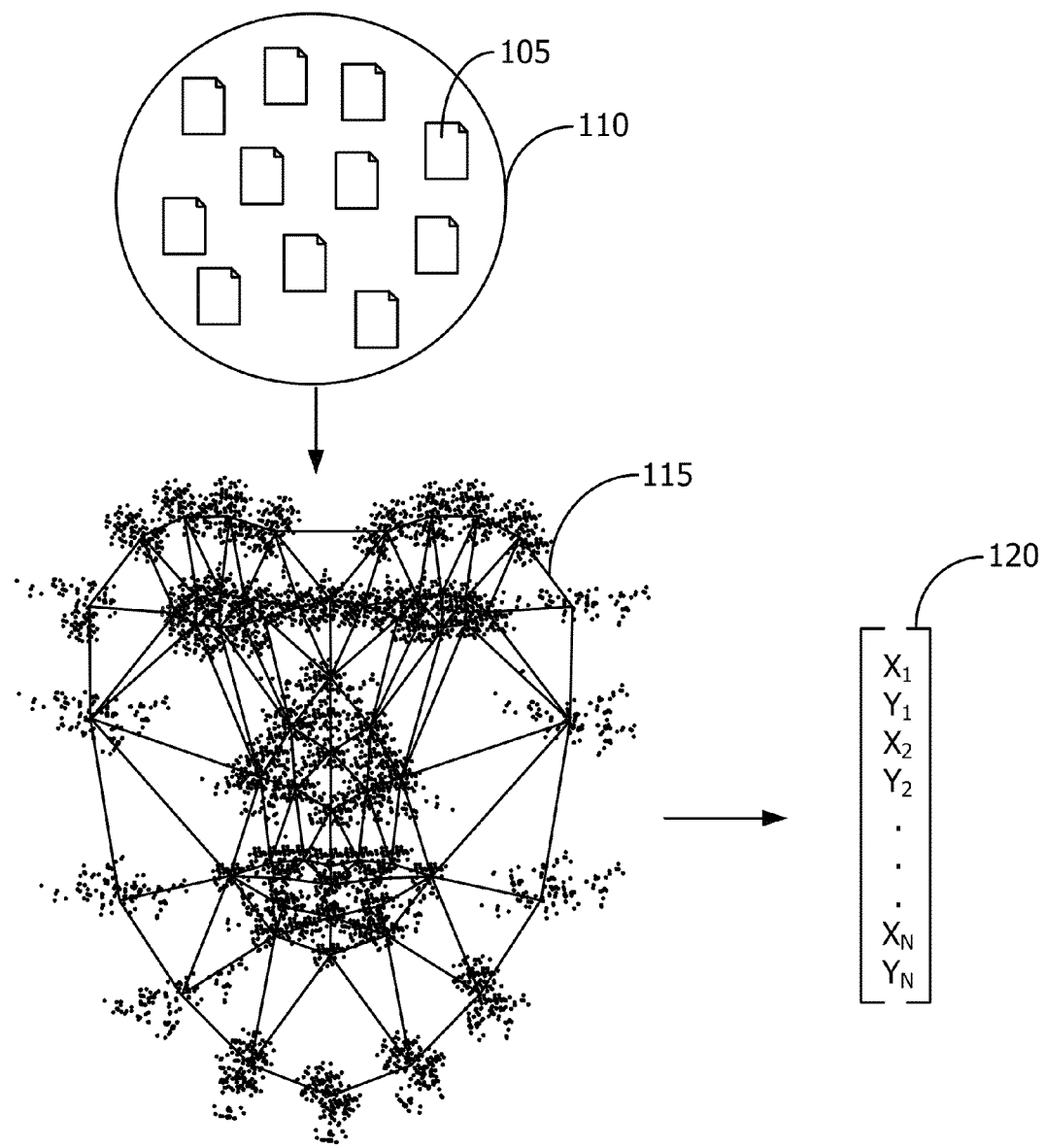
FIG. 1 illustrates a mean shape generated from a set of training data to identify face landmark points in a sample image.
Figure 2:
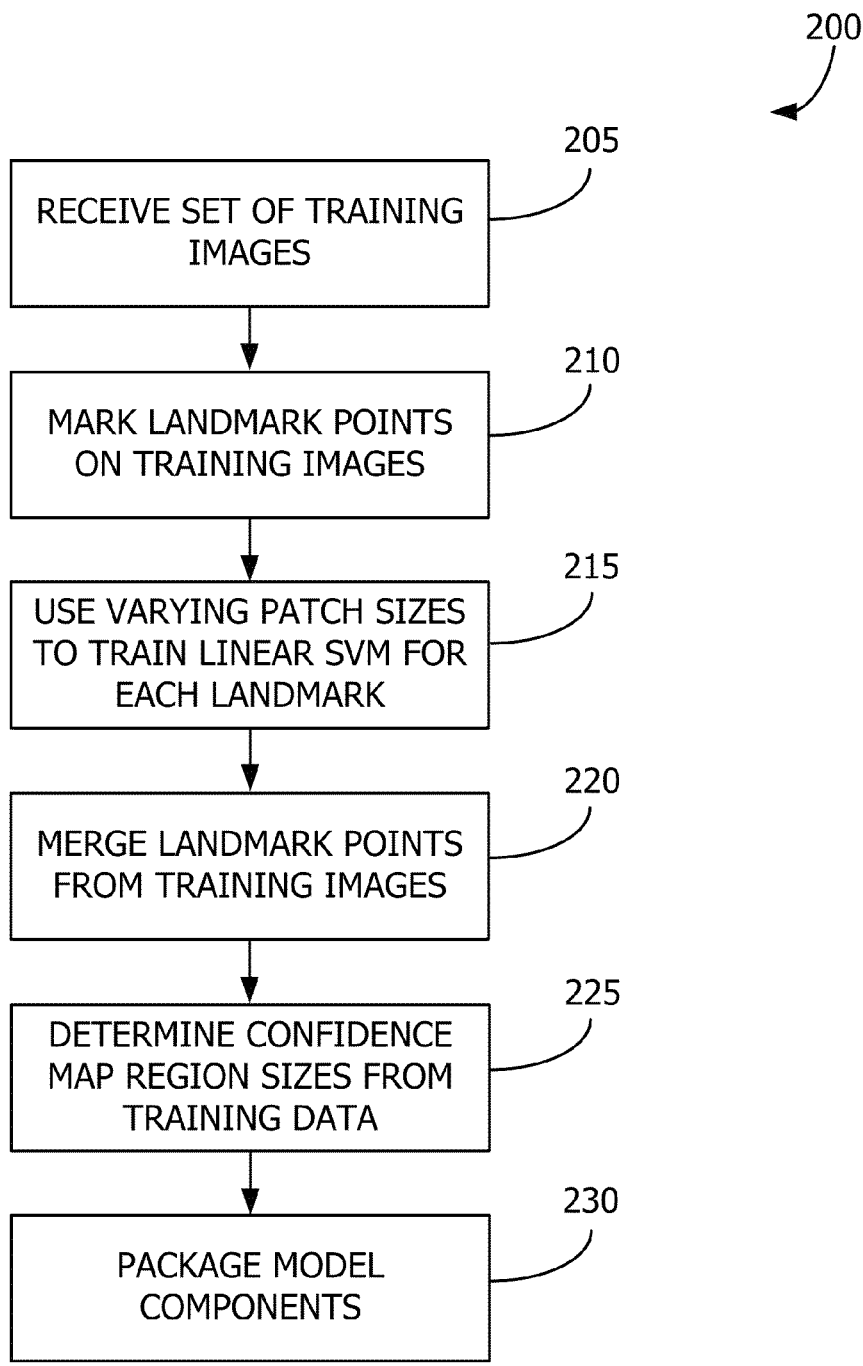
FIG. 2 illustrates an operation to train an object landmark detector in accordance with one embodiment.

Referring to FIG. 2, in accordance with one embodiment, landmark detection training operation 200 may begin with the receipt of a set of training images (block 205). As described above, each of the images in the set of training images may depict a particular type of object. For example, in one embodiment, the images in the set of training images may each depict a human face. In other embodiments, the training images may depict people, pets, vehicles, or other objects of interest. The received images may then be annotated to specify the location of predetermined landmark points in each image (block 210). The landmark points may be selected to correspond to easily identifiable features of the particular object of interest. For example, a model for a landmark detection algorithm to locate faces may be constructed from a set of images that are annotated to identify the location of eyes, eyebrows, nose, lips, and other recognizable facial features. The landmark points for a face detector may be similar to those illustrated in mean shape 115 of FIG. 1.

As described above, the annotated training images may be used to construct a model that includes a shape model and a data attachment term. In accordance with training operation 200, the training data may be analyzed to generate a Constrained Local Model. The data attachment term may be a filter for each landmark point that can be applied to a sample image to generate a confidence map for a region surrounding each landmark point. These filters may be constructed from the output of a linear support vector machine. As is known by those of ordinary skill in the art, a linear support vector machine training algorithm builds a model that assigns a given input into one of two classes. Therefore, by providing a linear support vector machine with sets of data corresponding to one of two classes, the linear support vector machine can "learn" to distinguish between the two classes. In the context of operation 200, the linear support vector machine may be trained by providing a first set of image data from patches of training images 105 that are centered on landmark points and a second set of image data from patches of training images 105 that are slightly displaced from the landmark points. By analyzing the sets of data from patches that are identified as centered on (i.e., aligned with) the landmark points and the patches that are identified as displaced from (i.e., not aligned with) the landmark points, the linear support vector machine can be used to generate filters that are used to identify a point in a sample image that corresponds to a landmark point.

Figure 3A:
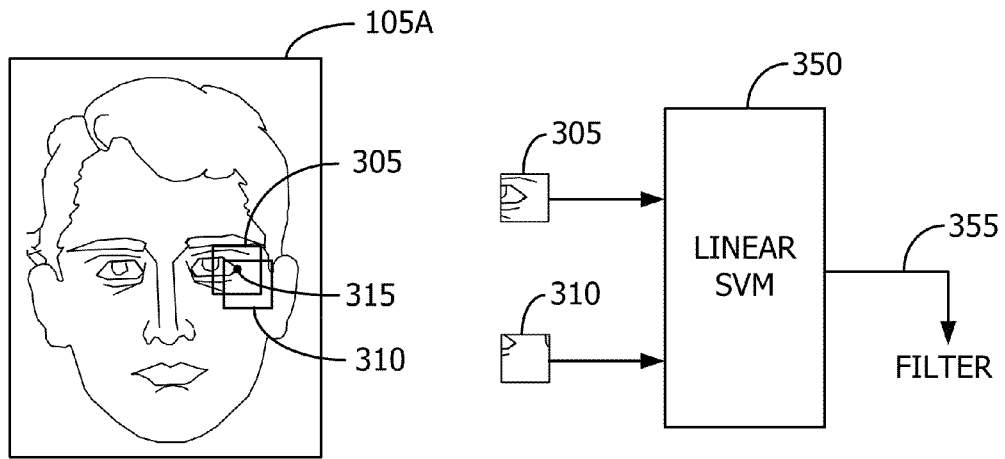
FIGS. 3A and 3B illustrate operations to train linear support vector machines in accordance with existing training operations and an embodiment of the disclosure, respectively.

Referring to FIG. 3A, for existing Constrained Local Models, linear support vector machines are trained using image patches having a constant size and a fixed square aspect ratio. In the illustrated embodiment, image data from a particular training image 105A is provided to linear support vector machine training algorithm 350. As illustrated, image data within patch 305, which is centered on eye corner landmark point 315, and image data from patch 310, which is slightly offset from landmark point 315, are provided to linear support vector machine training algorithm 350. For existing Constrained Local Model training using linear SVMs, image data within a patch having an identical size and aspect ratio to patches 305 and 310 may be provided for each landmark in each training image. For example, linear support vector machine training algorithm 350 may be trained to identify landmark point 315 within a sample image by being provided with image data from within a patch having a constant size applied across multiple training images. Accordingly, the data provided to linear support vector machine training algorithm 350 is limited by the patch features (i.e., patch size and aspect ratio). This limitation on the input data, in turn, limits the accuracy of filter 355 generated from the training data, which results in limited accuracy of the confidence map generated by filter 355 when applied to a particular sample image.

Figure 3B:
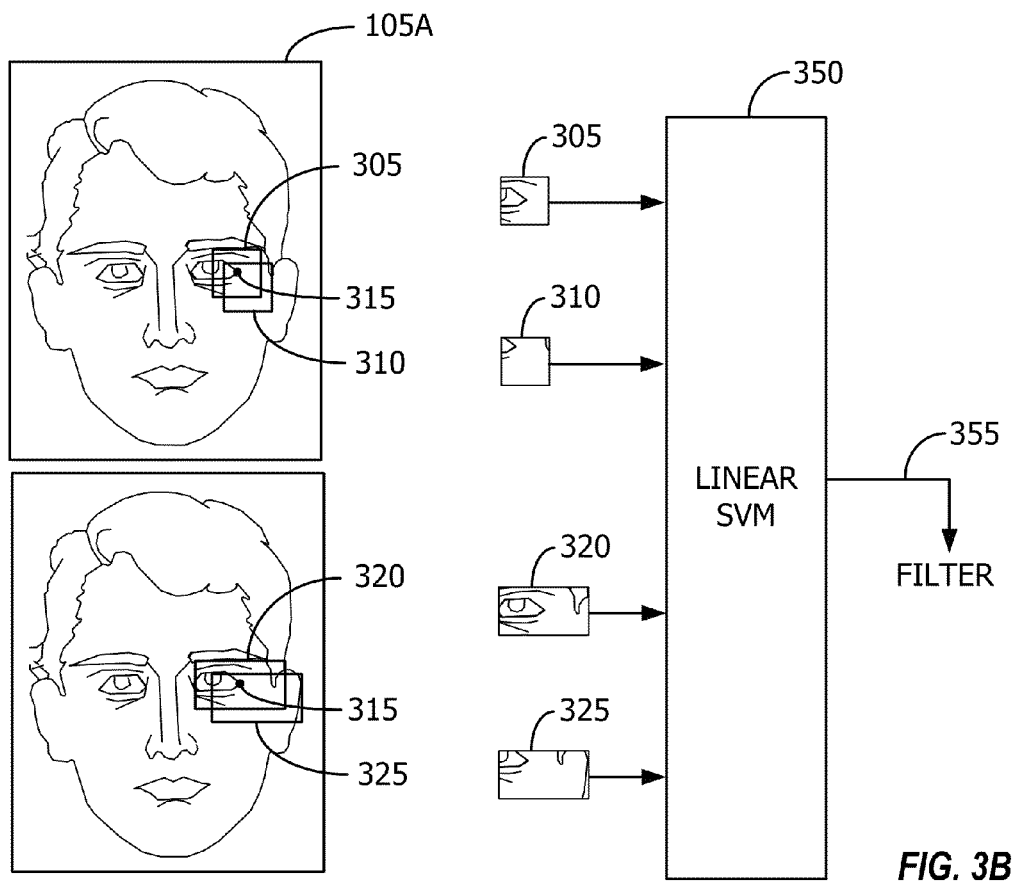

Referring to FIG. 3B, rather than supplying linear SVM training algorithm 350 with image data gathered using a fixed patch size, in one embodiment, image data from training images is collected using patches of varying sizes and aspect ratios (block 215). By way of example, in addition to supplying linear SVM training algorithm 350 with image data from fixed patch sizes 305 and 310, image data from within a rectangular patch 320 centered on landmark 315, and from within corresponding rectangular patch 325, offset from landmark 315, is supplied to training algorithm 350. It will be understood that patches having different sizes and shapes than those illustrated can be selected for the retrieval of image data from training images. Moreover, although FIG. 3B illustrates the provision of two different sets of positive (i.e., aligned) and negative (i.e., not aligned) image data to training algorithm 350 for a single landmark point in a single training image, more or fewer sets of data may be provided. In one embodiment, image data may be obtained from each landmark point using each of multiple predetermined patches (i.e., patches having predetermined shapes and sizes) for analysis by linear SVM training algorithm 350. In another embodiment, image data may be obtained for a particular landmark point using a patch that is randomly selected from a set of predetermined patches. It will be understood that additional image data may also be obtained by altering the amount and direction of displacement of the patch to obtain the negative data sets. It has been determined that by utilizing patches of varying sizes and shapes, linear support vector machines may be better trained to generate filters 355 having improved accuracy and an optimal size and shape, which results in significantly improved accuracy of confidence maps generated from the filters.

Figure 4A:
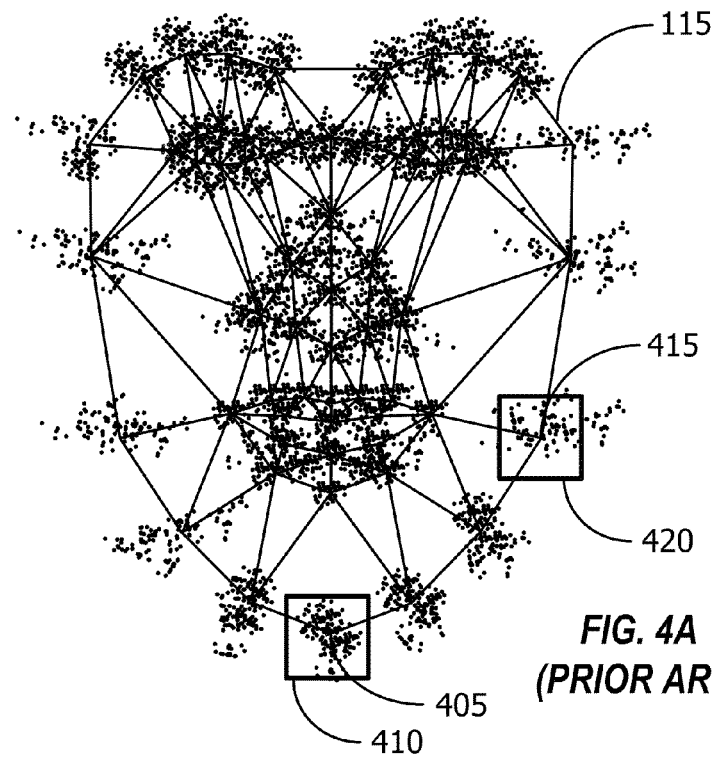
FIGS. 4A and 4B illustrate operations to determine the size of confidence map regions associated with a Constrained Local Model in accordance with existing training operations and an embodiment of the disclosure, respectively.

Returning to FIG. 2, the landmark points from the training images may be merged such that the coordinates of all of the landmark points can be expressed in terms of a common two-dimensional space (block 220). With the landmark points represented in a common two-dimensional space, the average location for each landmark point may be determined. Referring to FIG. 4A, the average locations of the landmark points for an example set of training images of human faces are illustrated as the vertices of mesh 115. For existing Constrained Local Models, a confidence map is generated by applying a filter (learned from the training data) to a region of fixed size surrounding each landmark point. That is, one or more vertices of mesh 115 may be aligned with corresponding points of a depicted object (e.g., a depicted face) in a sample image and a confidence map (e.g., representing the likelihood that sample image data represents a particular landmark point) may be generated in a fixed size region centered on each vertex of mesh 115. For example, a confidence map may be generated by applying a filter corresponding to landmark point 405 to sample image data within region 410 centered on landmark point 405. In the same manner, a confidence map may be generated by applying a filter corresponding to landmark point 415 to sample image data within region 420 centered on landmark point 415. It should be noted that, although only two regions are illustrated in FIG. 4A for purposes of clarity, a confidence map may be generated within a region of a common size for each landmark point. Therefore, according to existing Constrained Local Models, the generated confidence maps have a common size for each landmark point regardless of variations in training data.

Figure 4B:
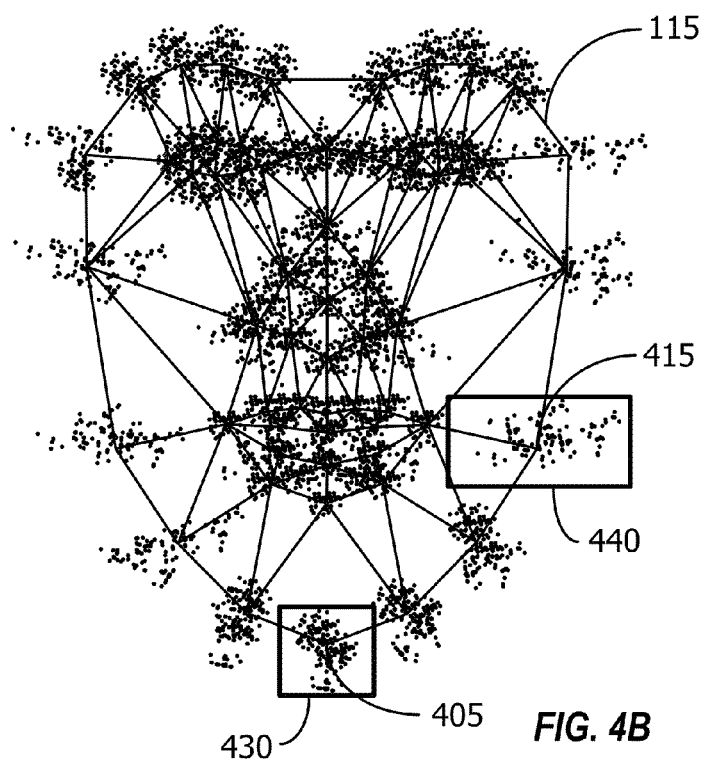

In accordance with an embodiment of training operation 200, the confidence map sizes for each landmark point may be determined separately based on properties of the training data (block 225). Confidence maps need to be generated around each initial landmark point in a region large enough to include the correct position where the landmark point should converge. Therefore, it has been determined that the accuracy of a Constrained Local Model may be improved by determining the optimal confidence map region size for each landmark independently by analyzing the training data for each particular landmark. In one embodiment, the confidence map region size may be determined by measuring a statistical parameter of the data points corresponding to a particular landmark. For example, once the mean location for a landmark point is identified, the distance from the mean location for each of the data points corresponding to that landmark may be identified. The statistical variance may then be determined from the distance information and the confidence region size can be adjusted according to the variance. In one embodiment, the confidence map region size may be adjusted as a function of variance such that the region size encompasses a predetermined percentage of the data points associated with a particular landmark. Accordingly, it may be determined that a larger confidence map region size is appropriate for larger variance measures and a smaller confidence map region size may be appropriate for smaller variance measures. Referring to FIG. 4B, a confidence map may be generated by applying a filter corresponding to landmark point 405 to sample image data within region 430 centered on landmark point 405. Similarly, a confidence map may be generated by applying a filter corresponding to landmark point 415 to sample image data within region 440 centered on landmark point 415. As will be noted, it may be determined during training operation 200 that region 430 should be smaller than region 440 because the data points corresponding to landmark point 405 are more tightly coupled to the mean landmark location as compared to the data points corresponding to landmark point 415, which are more dispersed from the average landmark location. Therefore, based on the properties of data points associated with a particular landmark, the optimal confidence map region size may be determined such that the region is large enough that it is likely to encompass a sample image location to which the landmark point should converge but also small enough that the landmark point can converge quickly without excessive calculation. In one embodiment, the confidence map region size may be expressed as a property of the model. That is, each landmark point in the model may have a corresponding filter and each filter may have a specified region. Application of a landmark point's corresponding filter within the filter's specified region (e.g., the region size and shape determined based on the training data associated with the landmark point) may result in the generation of a confidence map within a region that is determined based on the training data.

Returning to FIG. 2, the information determined through training operation 200 may be packaged as part of the Constrained Local Model to be subsequently applied to the sample image (block 230). The Constrained Local Model may include a shape model that is defined as a base shape $s_0$ (e.g., mean shape) and a linear combination of displacement modes $v_i$ as:

$$s = s_0 + \sum_{i=0}^{n} \alpha_i v_i, \qquad (1)$$

where $\alpha_i$ is a displacement coefficient for a corresponding displacement mode $v_i$. As described above, the Constrained Local Model may additionally include a data attachment term. The data attachment term learned through operation 200 may include a filter for each landmark point. As described above, the filters may be generated by providing a linear support vector machine with positive and negative data sets from patches of training images having varying shapes and sizes for each landmark point to generate filters having an optimal size and shape. The data attachment term may additionally include a confidence map region size for each landmark point. The confidence map region sizes may be determined based on the variance in training data points for each individual landmark point.

Figure 5:
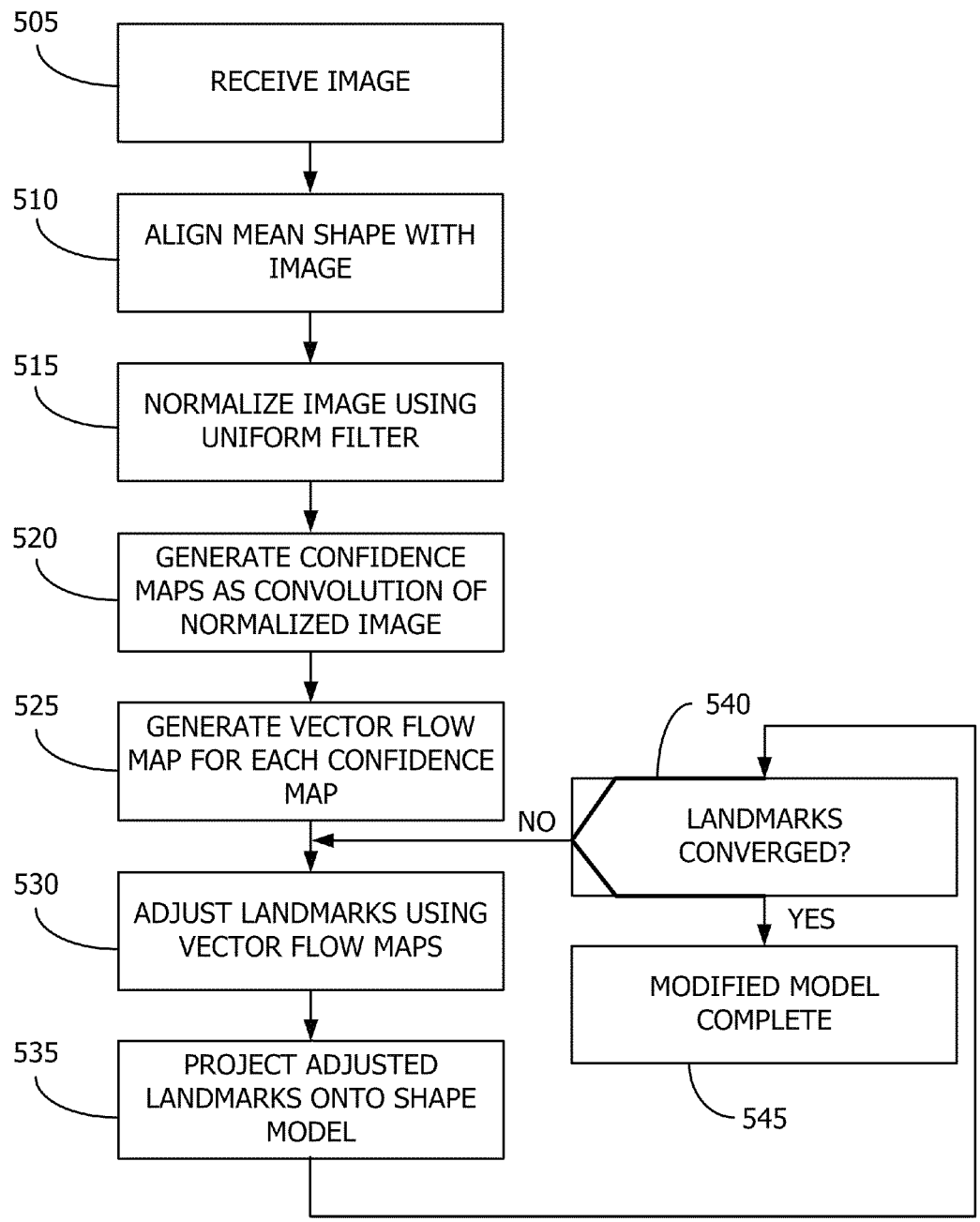
FIG. 5 illustrates an operation to detect landmark points in a sample image in accordance with one embodiment.
Figure 6:
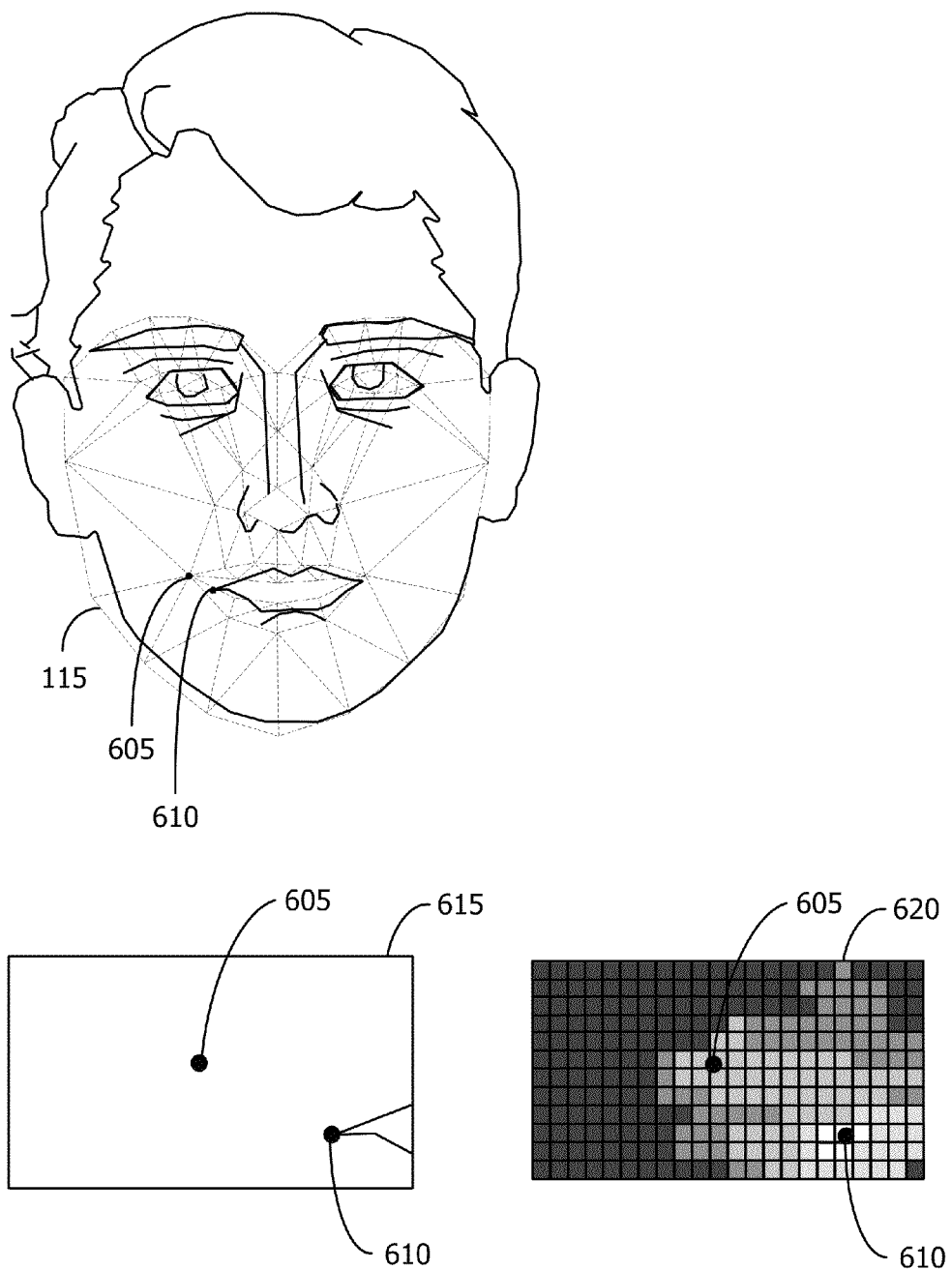
FIG. 6 illustrates the adjustment of a model landmark point towards a corresponding landmark point in a sample image in accordance with one embodiment.

Referring now to FIG. 5, in accordance with one embodiment, fitting operation 500 may begin with the receipt of a sample image (block 505). Upon receiving the sample image, the mean shape from the generated Constrained Local Model may be aligned with the image (block 510). In one embodiment, a feature detector may be applied to the sample image to identify one or more features within the sample image. For example, an eye detector may be applied to the sample image to identify the location of eyes in the sample image. The identified features may then be aligned with corresponding features of the mean shape. For example, the known location of eyes in a mean shape may be aligned with the detected location of eyes in the sample image. In one embodiment, the mean shape may be resized such that the mean shape may be aligned with the sample image. In one embodiment, the alignment of the mean shape with the sample image may include a three point alignment. In such an embodiment, the known location of eyes and a mouth in the mean shape may be aligned with the detected locations of corresponding points in the sample image. The alignment of mesh 115 (which represents a mean shape generated from training data) with an example sample image is illustrated in FIG. 6. It will be noticed that, while the alignment defines an approximate position of the mean shape relative to the object depicted in the sample image, the initial landmark points need to be adjusted toward the actual corresponding points of the depicted object. By way of example, landmark point 605, which corresponds to the mean location of a mouth corner based on the training data, should be moved towards its actual corresponding location 610 in the sample image.

Returning to FIG. 5, the sample image may be normalized by applying a uniform filter across the image as a whole (block 515). While the normalization step is illustrated after the alignment step, it should be noted that the order of these operations can be changed. Image normalization as a whole represents another deviation from existing Constrained Local Model fitting operations. In existing Constrained Local Model fitting operations, the generation of confidence maps for each landmark point involves the performance of a zero-mean normalized cross correlation (ZNCC) operation to apply a filter to the image data within a confidence map region. The ZNCC operation includes computing the local mean and variance of the image intensity within each confidence map region. This is a very time intensive operation and represents a significant bottleneck in existing Constrained Local Model fitting operations. Instead of normalizing each confidence map region independently as in existing Constrained Local Model operations, operation 500 normalizes the image as a whole (block 515). In one embodiment, the normalization operation may include the application of a uniform filter across the image. In such an embodiment, the filter may first blur the sample image (e.g., to reduce the effects of image noise on the normalized image) and then normalize the image such that pixel values are expressed in terms of the distance of a pixel value's intensity from the mean intensity. In one embodiment, the sample image may be normalized to zero mean and unit variance in either direction from the mean. That is, pixels having an intensity value equal to the average intensity across the image may be normalized to a value of zero while pixels having the lowest and highest intensity values across the image may be normalized to values of −1 and 1, respectively.

It has been unexpectedly determined that the normalization of the sample image as a whole offers a significant performance improvement in that confidence maps for each landmark point can be generated as a simple convolution of a filter corresponding to a particular landmark point (e.g., a filter generated by a linear support vector machine as described above) on a portion of the normalized image corresponding to the confidence map region associated with the landmark point (e.g., determined based on training data variance for the landmark point as described above) (block 520). The generation of confidence maps by performing a convolution algorithm on the normalized image is much more efficient than existing Constrained Local Model confidence map generation. Existing Constrained Local Model confidence map generation requires execution of a zero-mean normalized cross correlation algorithm for each confidence map region, which involves the computation of the mean and variance for each confidence map region to normalize the regions independently. By normalizing the sample image as a whole as a pre-computation, a significant performance increase can be obtained by generating the confidence maps using a much more efficient convolution algorithm.

The confidence map regions generated at block 520 represent the likelihood that sample image data within a particular confidence map region represents a particular landmark corresponding to the confidence map region. Returning to FIG. 6, the model parameter that identifies the shape and size of the confidence map region (e.g., the size determined based on training data variance) and the filter for mouth corner landmark point 605 may be retrieved. Using the retrieved confidence map region and filter parameters for mouth corner landmark 605, the filter can be applied as a convolution on the normalized image data within region 615 centered on landmark point 605 to generate confidence map 620. In the illustrated embodiment, the value of each pixel in confidence map 620 represents the likelihood that the image data associated with the pixel depicts the landmark point. The initial landmark points (e.g., landmark point 605) can then be adjusted towards the local maximum (e.g., the pixel having the highest value) within their respective confidence maps until they converge on the proper location.

Figure 7A:
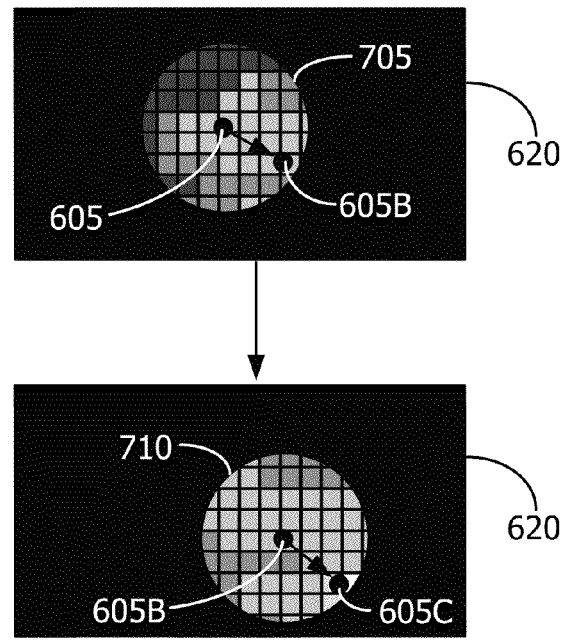
FIGS. 7A and 7B illustrate operations to adjust a model landmark point towards a corresponding landmark point in a sample image based on a generated confidence map in accordance with existing fitting operations and an embodiment of the disclosure, respectively.

Returning to FIG. 5, it has been determined that the initial landmark points can be more efficiently adjusted towards the local maximum within their respective confidence maps by calculating a vector flow map for each confidence map as a pre-computation (i.e., before adjusting the landmark points) (block 525). Existing Constrained Local Models employ a mean shift algorithm to adjust landmark points towards a local maximum. As is known by those of skill in the art, a mean shift algorithm involves the calculation of a weighted local mean within a neighborhood surrounding the landmark point. Referring to FIG. 7A, in accordance with the adjustment of landmark points for existing Constrained Local Models, a weighted local mean of the pixel values within neighborhood 705 surrounding landmark point 605 may be calculated and landmark point 605 may be adjusted to location 605B based on the calculated weighted local mean. The weighted local mean of the pixel values within neighborhood 710 surrounding location 605B may then be calculated and landmark point 605B may be adjusted to location 605C. The process may be continued iteratively until the mean shift algorithm converges on the proper location. Adjustment of the landmark points according to the mean shift algorithm involves, at each iteration, calculating the weighted local mean of the confidence map, displacing the landmark point, and projecting the displaced landmark point onto the shape model. This is a time consuming operation as it involves a relatively complex computation at each iteration and often requires many iterations for the algorithm to converge.

Rather than adjusting the landmark point locations using an iterative mean shift algorithm (which requires the determination of a local mean and displacement at each iteration), it has been determined that the efficiency of the landmark point adjustment process can be significantly improved by generating a vector flow map of displacement for each confidence map as a pre-computation (i.e., before adjusting the landmark points). In one embodiment, the vector flow map can be generated using an efficient recursive Gaussian filter applied to the confidence map.

Figure 7B:
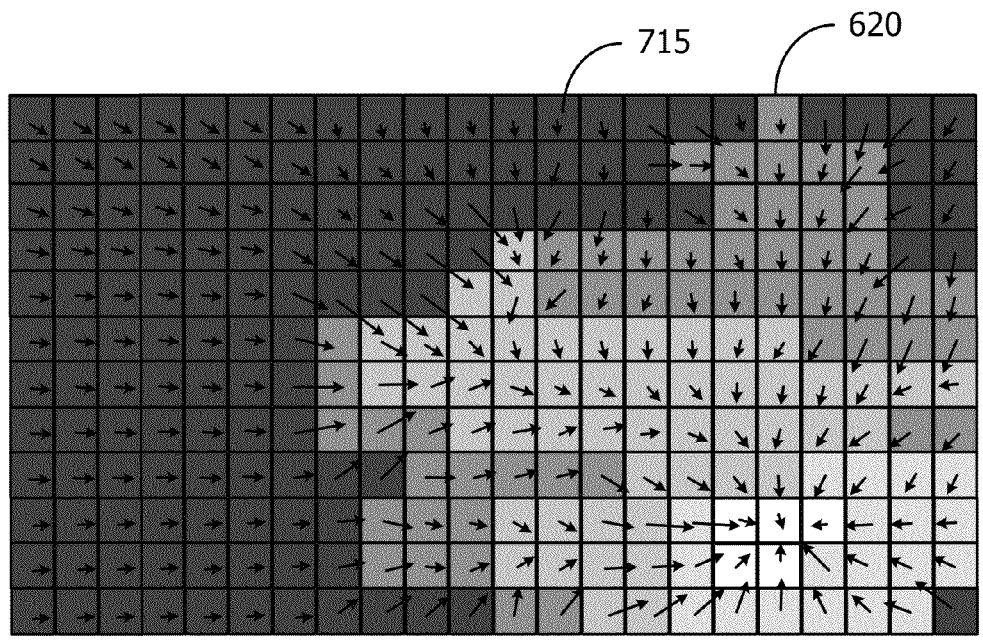

Generation of the vector flow map essentially involves the pre-calculation of the landmark displacement direction and magnitude by determining the mean shift for each pixel as a pre-computation. Therefore, the landmark displacement direction and magnitude can be calculated by identifying the mean shift for each pixel as a pre-computation rather than iteratively. As illustrated in FIG. 7B, the displacement magnitude and direction for any location (e.g., for each pixel location) within confidence map 620 may be specified by pre-computed vector flow map 715. Therefore, vector flow map 715 can be used to adjust the location of a landmark point towards the correct landmark location for any location within confidence map 620.

Because each vector in the vector flow map represents the mean shift for a particular pixel, the vector flow calculation may include a neighborhood parameter within which the local mean for each pixel location is identified (similar to neighborhoods 705 and 710 of FIG. 7A). In one embodiment, the neighborhood parameter (e.g., the size of the neighborhood within which the local mean is computed) may be determined based on the variance in the training data for a particular landmark. The accuracy of the vector flow map and the efficiency with which it is generated may be improved by increasing the neighborhood size where the training data indicates a high degree of variance for a particular landmark point (e.g., where more data may be valuable in determining the magnitude and direction of displacement at a given location) and by decreasing the neighborhood size where the training data indicates a small degree of variance for a particular landmark point (e.g., where less data is needed to determine the magnitude and direction of displacement at a given location). The vector flow computation for each confidence map may therefore utilize a different neighborhood parameter based on the variance of the training data for a landmark point associated with the confidence map.

Returning to FIG. 5, each of the landmark points may be adjusted using the vector flow maps (block 530). Because the vector flow maps are pre-computed to identify the magnitude and direction of the displacement for any given location, the adjustment of the landmark may simply involve the identification of the vector corresponding to the given location. After each of the landmark points is adjusted, the displaced landmarks are projected back onto the shape model to verify that the shape is still valid (block 535). In one embodiment, projection of the adjusted points onto the shape model can be performed by multiplying the point vectors after displacement with the shape model basis vectors. This gives the closest orthogonal projection on the basis of the shape model. If each of the landmarks has converged on the local maximum in its respective confidence map (the "Yes" prong of block 540), the process is complete and the modified shape can be expressed in terms of a vector representing a concatenation of the displacement coefficients of the shape model (block 545). If, however, any of the landmarks have not converged on their respective local maximum (the "No" prong of block 540), the process continues at block 530 with the adjustment of those landmarks that have not converged (again using the pre-computed vector flow maps). Convergence of the landmark points can be measured against predefined stopping criteria. For example, when the displacement size or some other error measure satisfies a predefined threshold, it can be determined that a landmark point has converged. In another embodiment, the iterative operations may be concluded after a maximum number of iterations have been performed. The disclosed embodiments provide multiple improvements in the learning and fitting processes of a Constrained Local Model landmark detection operation.

Figure 8:
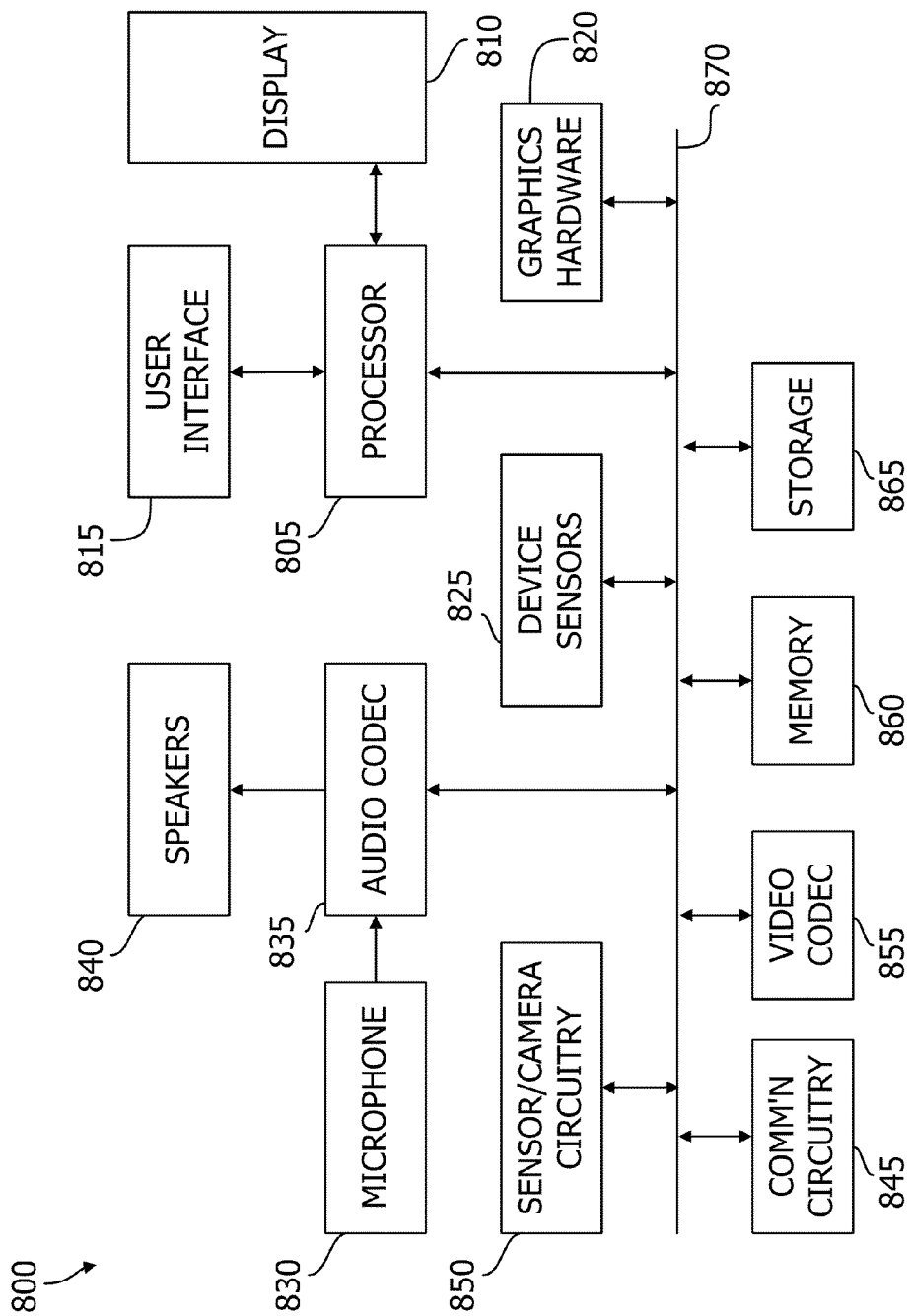
FIG. 8 shows an illustrative electronic device in accordance with one embodiment.

Referring to FIG. 8, a simplified functional block diagram of illustrative electronic device 800 is shown according to one embodiment. Electronic device 800 may include processor 805, display 810, user interface 815, graphics hardware 820, device sensors 825 (e.g., proximity sensor/ambient light sensor, accelerometer and/or gyroscope), microphone 830, audio codec(s) 835, speaker(s) 840, communications circuitry 845, digital image capture unit 850, video codec(s) 855, memory 860, storage 865, and communications bus 870. Electronic device 800 may be, for example, a digital camera, a personal digital assistant (PDA), personal music player, mobile telephone, server, notebook, laptop, desktop, or tablet computer. More particularly, the disclosed techniques may be executed on a device that includes some or all of the components of device 800.

Processor 805 may execute instructions necessary to carry out or control the operation of many functions performed by device 800. Processor 805 may, for instance, drive display 810 and receive user input from user interface 815. User interface 815 can take a variety of forms, such as a button, keypad, dial, a click wheel, keyboard, display screen and/or a touch screen. Processor 805 may also, for example, be a system-on-chip such as those found in mobile devices and include a dedicated graphics processing unit (GPU). Processor 805 may be based on reduced instruction-set computer (RISC) or complex instruction-set computer (CISC) architectures or any other suitable architecture and may include one or more processing cores. Graphics hardware 820 may be special purpose computational hardware for processing graphics and/or assisting processor 805 to process graphics information. In one embodiment, graphics hardware 820 may include a programmable graphics processing unit (GPU).

Sensor and camera circuitry 850 may capture still and video images that may be processed, at least in part, in accordance with the disclosed techniques by video codec(s) 855 and/or processor 805 and/or graphics hardware 820, and/or a dedicated image processing unit incorporated within circuitry 850. Images so captured may be stored in memory 860 and/or storage 865. Memory 860 may include one or more different types of media used by processor 805 and graphics hardware 820 to perform device functions. For example, memory 860 may include memory cache, read-only memory (ROM), and/or random access memory (RAM). Storage 865 may store media (e.g., audio, image and video files), computer program instructions or software, preference information, device profile information, and any other suitable data. Storage 865 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 860 and storage 865 may be used to tangibly retain computer program instructions or code organized into one or more modules and written in any desired computer programming language. When executed by, for example, processor 805 such computer program code may implement one or more of the operations described herein.

It is to be understood that the above description is intended to be illustrative, and not restrictive. The material has been presented to enable any person skilled in the art to make and use the inventive concepts described herein, and is provided in the context of particular embodiments, variations of which will be readily apparent to those skilled in the art (e.g., some of the disclosed embodiments may be used in combination with each other). Many other embodiments will be apparent to those of skill in the art upon reviewing the above description. The scope of the invention therefore should be determined with reference to the appended claims, along with the full scope of equivalents to which such claims are entitled. In the appended claims, the terms "including" and "in which" are used as the plain-English equivalents of the respective terms "comprising" and "wherein."

The invention claimed is:

1. A non-transitory program storage device, readable by a processor and comprising instructions stored thereon to cause one or more processors to:
   receive a digital image comprising image data and having depicted therein an object, the object having points;
   obtain a shape model corresponding to the object, wherein the shape model comprises a plurality of landmark points, each landmark point having a filter, each filter having a specified region;

align one or more of the landmark points with corresponding points of the object;
normalize the received image;
generate, for each landmark point, a confidence map based, at least in part, on the landmark point's corresponding filter and the normalized image, wherein each confidence map represents a likelihood that image data circumscribed by the corresponding landmark point's filter's specified region corresponds to the landmark point;
generate a vector flow map for each confidence map; and
move at least one landmark point toward the object's corresponding point based, at least in part, on the landmark point's corresponding vector flow map.

2. The non-transitory program storage device of claim 1, wherein the instructions to cause the one or more processors to align one or more of the landmark points with corresponding points of the object comprise instructions to cause the one or more processors to apply an object detector to the received image.

3. The non-transitory program storage device of claim 1, wherein each of the landmark points represents an average location of corresponding points from a plurality of annotated training images.

4. The non-transitory program storage device of claim 1, wherein the instructions to cause the one or more processors to normalize the received image comprise instructions to cause the one or more processors to apply a uniform filter to the received image as a whole.

5. The non-transitory program storage device of claim 4, wherein the instructions to cause the one or more processors to apply a uniform filter to the received image as a whole comprise instructions to cause the one or more processors to apply a uniform filter to generate a zero mean unit variance normalized image.

6. The non-transitory program storage device of claim 1, wherein properties of each landmark point's filter's specified region are determined based, at least in part, on a variance in training data associated with the landmark point.

7. The non-transitory program storage device of claim 1, wherein the instructions to cause the one or more processors to generate, for each landmark point, a confidence map comprise instructions to cause the one or more processors to apply the landmark point's filter as a convolution operation on the normalized image.

8. The non-transitory program storage device of claim 1, wherein the instructions to cause the one or more processors to generate a vector flow map for each confidence map comprise instructions to cause the one or more processors to apply a recursive Gaussian filter to each confidence map.

9. The non-transitory program storage device of claim 1, wherein the vector flow map specifies a movement direction and magnitude for each image data pixel circumscribed by the confidence map's corresponding landmark point's filter's specified region.

10. The non-transitory program storage device of claim 9, wherein the instructions to cause the one or more processors to move at least one landmark point toward the object's corresponding point comprise instructions to cause the one or more processors to move the at least one landmark point in accordance with the direction and magnitude of a location in the landmark point's vector flow map corresponding to a current location of the landmark point.

11. The non-transitory program storage device of claim 1, wherein the instructions to cause the one or more processors to generate a vector flow map for each confidence map comprise instructions to cause the one or more processors to determine, for each confidence map, a local mean of the confidence map within a sub-region surrounding each of a plurality of locations in the confidence map.

12. The non-transitory program storage device of claim 11, wherein the instructions to cause the one or more processors to determine, for each confidence map, a local mean of the confidence map within a sub-region surrounding each of a plurality of locations in the confidence map comprise instructions to cause the one or more processors to determine a size of the sub-region based, at least in part, on a variance in training data for the landmark point corresponding to the confidence map.

13. A method of detecting landmark points in an image, comprising:
receiving, using one or more processors, an image;
aligning, using the one or more processors, a portion of a shape model with a corresponding portion of an object depicted in the sample image;
normalizing, using the one or more processors, the image;
generating, using the one or more processors, a confidence map within a region surrounding each of a plurality of points of the shape model, wherein each confidence map specifies a likelihood that image data within the region represents a point of the object that corresponds to the point of the shape model with which the confidence map is associated;
generating, using the one or more processors, a vector flow map for each of the confidence maps; and
moving, using the one or more processors, each point of the shape model according to a parameter of the vector flow map corresponding to a current location of the point of the shape model.

14. The method of claim 13, wherein the shape model is a face shape model.

15. The method of claim 13, wherein the image is a medical image.

16. The method of claim 13, wherein the act of generating a confidence map within a region surrounding each of a plurality of points of the shape model comprises determining, using the one or more processors, one or more properties of the region based on a corresponding point of the shape model.

17. The method of claim 16, wherein the act of determining one or more properties of the region based on a corresponding point of the shape model comprises determining, using the one or more processors, a shape and size of the region based on a variance in training data associated with the corresponding point of the shape model.

18. The method of claim 13, wherein the act of generating a vector flow map for each of the confidence maps comprises determining, using the one or more processors, a local mean within a neighborhood surrounding each of a plurality of locations within the region associated with each confidence map.

19. The method of claim 18, wherein the act of determining a local mean within a neighborhood surrounding each of a plurality of locations within the region associated with each confidence map comprises determining, using the one or more processors, a size of the neighborhood based on the point of the shape model with which the confidence map is associated.

20. The method of claim 19, wherein the act of determining a size of the neighborhood based on the point of the shape model with which the confidence map is associated comprises identifying, using the one or more processors, a variance in training data corresponding to the point of the shape model with which the confidence map is associated.

21. A system, comprising:
a memory; and one or more processors operatively coupled to the memory and configured to execute program code stored in the memory to cause the one or more processors to:
- receive a digital image comprising image data and having depicted therein an object, the object having points;
- obtain a shape model corresponding to the object, wherein the shape model comprises a plurality of landmark points, each landmark point having a filter, each filter having a specified region;
- align one or more of the landmark points with corresponding points of the object;
- normalize the received image;
- generate, for each landmark point, a confidence map based, at least in part, on the landmark point's corresponding filter and the normalized image, wherein each confidence map represents a likelihood that image data circumscribed by the corresponding landmark point's filter's specified region corresponds to the landmark point;
- generate a vector flow map for each confidence map; and
- move at least one landmark point toward a corresponding point of the object based, at least in part, on the landmark point's corresponding vector flow map.

22. The system of claim 21, wherein each of the landmark points represents an average location of corresponding points from a plurality of annotated training images.

23. The system of claim 21, wherein the program code to cause the one or more processors to normalize the received image comprises program code to cause the one or more processors to apply a uniform filter to the received image as a whole.

24. The system of claim 21, wherein properties of each landmark point's filter's specified region are determined based, at least in part, on a variance in training data associated with the landmark point.

25. The system of claim 21, wherein the program code to cause the one or more processors to generate, for each landmark point, a confidence map comprises program code to cause the one or more processors to apply the landmark point's filter as a convolution operation on the normalized image.

26. The system of claim 21, wherein the program code to cause the one or more processors to generate a vector flow map for each confidence map comprises program code to cause the one or more processors to determine, for each confidence map, a local mean of the confidence map within a sub-region surrounding each of a plurality of locations in the confidence map.

27. The system of claim 26, wherein the program code to cause the one or more processors to determine, for each confidence map, a local mean of the confidence map within a sub-region surrounding each of a plurality of locations in the confidence map comprises program code to cause the one or more processors to determine a size of the sub-region based, at least in part, on a variance in training data for the landmark point corresponding to the confidence map.

* * * * *